Aug. 7, 1956
C. S. EVANS
2,757,483
PLANT TIE
Filed May 23, 1950
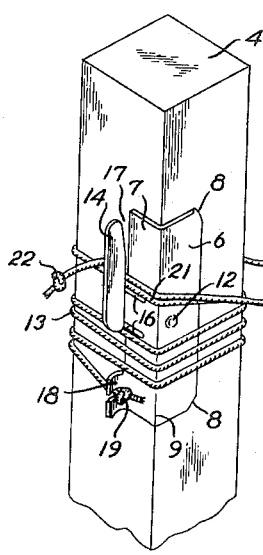
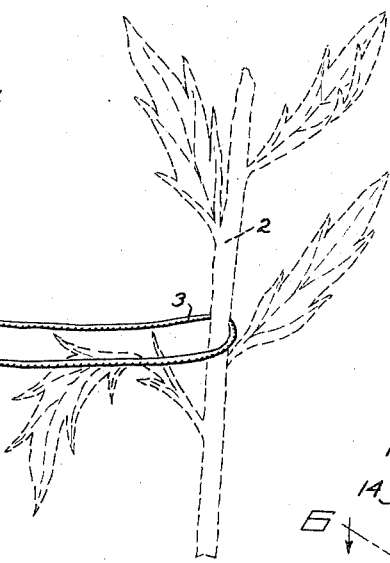
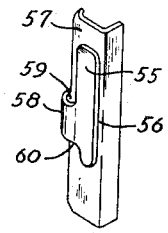
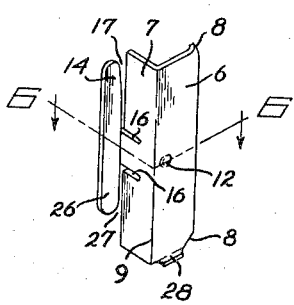
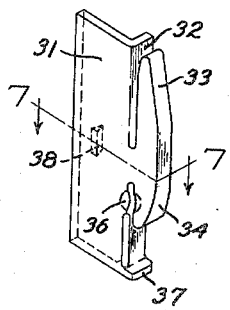
INVENTOR
Charles S. Evans

United States Patent Office 2,757,483
Patented Aug. 7, 1956

2,757,483

PLANT TIE

Charles S. Evans, Atherton, Calif.

Application May 23, 1950, Serial No. 163,698

3 Claims. (Cl. 47—47)

My invention relates to means for tying plants to a stake; and the broad object of the invention is to provide means for the economical and expeditious tying up of long stem plants to individual supporting stakes. Among other objects of the invention are the provision of plant tying means of trifling cost, capable of repeated uses and readjustments on any size of stake, and attachable and detachable within seconds of time and with the simplest of manipulation.

The invention possesses other objects and features of value, some of which with the foregoing will be set forth at length in the following description of my invention. It is to be understood that the invention is not limited to a form shown in the drawings since the invention may be embodied in different forms as recited in the claims.

Referring to the drawings: Fig. 1 is a perspective view of one embodiment of my invention showing its use in supporting a plant. Figs. 2, 3, 4, 5, and 8 are respectively, perspective views of other embodiments of the plate portion of my invention. Figure 6 is a cross sectional view of the plate, taken in the plane 6—6 of Fig. 2; and Fig. 7 is a cross-sectional view of the plate taken in the plane 7—7 of Fig. 3.

Every gardener knows the problem posed by the staking of individual plants. Tying up a few chrysanthemums to a supporting stake and then adjusting the ties from time to time as the stems lengthen, is not too arduous a garden chore, if devotion be great, the supply of cord and stakes be ample, and some skill be had in tying the gardener's knot, but with even twenty-five long stem plants, the tying-up job is burdensome; and with fifty or sixty it become formidable, and perforce largely neglected.

Few long stemmed plants are self-supporting, and few are satisfactory in private gardens when given mass support, as in bedding, or in rows between restraining strings. Dahlias, iris, carnations, delphiniums, chrysanthemums are only a few of the plants, long stemmed at maturity, which should have not only stake support, but several adjustments of the supporting tie during growth.

My plant tie is designed to cut across most of these difficulties and provide a cheap and simple means for the easy and rapid placement of a supporting loop at the proper height about a plant stem. Finished stakes of appropriate size are preferred on account of appearance, but any stick of sufficient strength and length will do. No knot-tying skill is needed; and the tie may be readjusted for height or removed for another use as easily and quickly as it is applied.

Referring now to Fig. 1 of the drawing, which shows a plant 2, held by the cord loop 3 to the supporting stake 4 by means of my tie plate which comprises a plate bent to form two parts 6 and 7 at right angles to each other. For convenience in reference, the part 6 which is preferably the wider, may be considered the main body of the plate, and the narrower part 7 a flange. The angle between body and flange is that between adjacent sides of most square stakes, that is 90°, but it is obvious that a curved plate may be made for bamboo canes or other round stakes.

In order that the tie plate shall easily retain any place on the stake in which it is set, the inside of the bend is provided with anchoring means such as pointed projections which are pressed into engagement with the wood. Preferably the outer corners 8 of the body are pressed over into points to serve as anchoring means, and preferably also, a point is struck out midway inside the bend and close to the angle edge 9, leaving a dimple 12 on the outer face of the plate. The main body 6 of the plate provides a broad flat surface, readily engaged by the thumb, so that the plate is applied and easily anchored in position by light pressure between thumb and fingers, the subsequent wrapping with the cord 13 retaining it securely in place.

Means are provided on the plate and preferably on the flange portion 7, for securing the cord 13 which has the dual function of holding the plate on the stake and providing a loop around the plant. Extending outwardly, and conveniently at 90° from the flange is the tongue 14 joined integrally to the flange by the U-shaped part 15, Fig. 6, which is interposed to impart an added resilience to the tongue lacking in a flat connection. This resilience in considerably increased by the slots 16 extending into the flange from each side of the U-shaped part.

Between the tongue and the flange is a slot 17 sized with reference to the cord to permit its snug engagement. The entrance to the slot is widened and the end of the tongue is rounded to facilitate the entrance of the cord. From the above it will be clear that the tongue 14 grips a cord within a suitable range of sizes, with a spring pressure which readily permits entry and withdrawal of the cord from the slot, but offers an effective resistance to tension stresses on the cord.

At the lower end of the flange, two short, spaced tongues 18 extend outwardly roughly in the same plane as the tongue 14, but preferably being cupped or dished as shown, the better to retain the knot 19 in the end of the cord. The groove between the tongues is somewhat smaller than the cord to help in its retention.

The plant tie is applied as follows: A stake long enough for the mature plant is selected. Stakes do not have to be the full height of the plant, and if the stem is tied at a point two-thirds of its total length from the ground, it is generally sufficient. Therefore a stake 18 inches long, set 4 or 5 inches in the ground is amply sufficient for a stem which at full growth will be 18 to 22 inches tall. If the plant to be staked is at full growth the tie plate is laid on a corner near the top and pressed tight against the stake to seat the anchor points.

One end of the cord is then caught between the tongues 18, the knot 19 seating in the cupped side, and then wound tightly for several turns around the stake and plate between the inner tongue 18 and the root of the tongue 14, as shown, binding the two tightly together. The last turn 21 around the stake is caught in the slot 17 and then carried out in the loop 3 around the plant, and the end with the knot 22 again caught in the slot. Instead of this procedure, some may prefer to bind the tie plate to the stake, before setting it in ground. There are advantages in both ways.

With a cord about 14 or 15 inches long, knotted at both ends, and with a ⅜ inch to ½ inch square stake, four turns around the stake leaves about 6 inches to 7 inches of cord for a loop, which is sufficient for most applications. However two turns around the stake gives ample security, if a longer loop is needed, for example, to enclose several stems. Any excess of cord length can be taken up by extra turns, or by forming two separate loops for the same stem or for separate stems.

Because the slot 17 will frictionally bind the cord at any point, the knotted end 22 is not depended on to prevent the cord pulling out of the slot; and with a cord 18 inches or 20 inches long a plurality of loops may be readily cast around four or five separate stems, the stake being set to one side of the root system and slanted enough to place the top and the tie plate in the center of the group. Such a practice is useful with certain chrysanthemums where a number of long and similar stems from the same root clump can be brought to flower at about the same time.

For the home garden I prefer a soft heavy cotton cord of suitable size, and preferably dark green in color, but for some commercial uses, where raffia is used for tying, the tie plate is made with a narrower slot so as to pinch the thin ribbon of the raffiia which may be used without knots. In this case the lower tongues 18 may be omitted, and securement of both ends of the raffia made in the slot 17; or the lower tongues may be replaced as shown in Figure 2 by a short downward extension 26 of the main tongue 14, and separated by the slot 27 from the supporting flange 7. This tie plate is particularly suited for a ribbon type of tie, which may be a fabric tape, or a plastic, or plastic-coated one. The slots 17 and 27 must of course be of a width to frictionally grip the tie used. A small lip 28 extends from the lower end of the flange to aid in retaining the coils of tie material wound about the plate.

In Figure 3, is shown a tie plate designed to be molded in plastic of the general type sold as "Vinylite" or "Tenite." A main body 31 is provided with a flange 32, from the face of which the two tongues 33 and 34 extend. The lower tongue 34 and the adjacent area on the body are formed with a recess 36 as a seat for the knot of the tie; and a short lip 37 at the lower end of the flange retains the binding turns of the tie. A chisel edge projection 38 on the inner face of the body serves as an anchoring point. This tie plate is very effective when made in red, green or yellow plastic and used with a similar color of plastic or plastic-covered tape.

Figs. 4 and 5 show modifications which differ somewhat from the structure of Fig. 1, in that the resilient tongue presses the tie cord which lies in the slot directly against the face of the stake. In Fig. 4, two oppositely extending tongues 40 are formed in the body 41 of the plate, being separated therefrom by the slots 42, and having their extreme ends 43 curved outwardly to facilitate insertion of the tie cord between the tongue and the face of the stake.

Cupped knot engaging short tongues 44, similar to those already explained in connection with Fig. 1, are extended out from the flange 46 of the tie plate; and anchor points under the dimples 47 are formed midway between the ends in the flat portion of the body, about which the first coils or turns of the tie cord are wound.

It will be observed that after the first turns of the cord are wound about the center portion of the plate, subsequent forcing of the cord under either of the tongues will tend to raise the tongue and plate and tighten the first applied turns. The chief advantage of this embodiment is its reversibility and adaptability for either clockwise or counterclockwise application of the tie cord.

In Fig. 5, the resilient tongue 49 is pressed from the middle part of the body portion 50, leaving a slot 51 around its sides and top. The flange 52 extends from the body and anchor points are formed from the turned down corners 53. In this embodiment, both beginning and end of the tie cord are caught in the slot and under the resilient tongue, the intervening binding coils being wound across the flat part of the body between the tongue base and the lip 54 on the lower end of the body. Here also the first cord turns around the body are tightened when subsequent turns are passed under the tongue.

In Figure 8, the tongue 55 is bent back to form a slot 56 between it and the body 57. The tongue is integrally connected to the body by the neck 58, long enough to position the tongue centrally of the body, and rounded out at the bent portion to give space 59 for the cord, the starting knot lying in the notch 60. This provides a secure fastening for the knotted end of the cord, while at the same time leaving the tongue undisturbed to resiliently grip the cord in the slot between its inner face and the body.

Hard brass of about .025" thickness with dull nickel finish is preferred as metal tie plate material. For stakes, California redwood is excellent because resistant to decay and insect attack, but it is decidedly inferior to Philippine mahogany in that regard as well as in strength and appearance. Almost any cord will work well, but a soft cotton cord of sufficient diameter to be gripped by the tongue of the tie plate and not cut the plant stem is preferred. Appearance is improved if a colored cord is used. While a cord knotted at the beginning end at least, is preferred, it is entirely practical to use an unknotted cord, winding over the beginning end as the binding turns are applied.

I claim:

1. A plant tying device for use with a stake and tying cord, comprising a plate flanged on one of its edges to lie flat against two adjacent sides of the stake, said plate having spaced slots in the edge opposite the flange, and a tongue integral with the plate between the slots and forming a slot between the main bodies of tongue and plate in which the binding turns of the cord may be gripped.

2. A plant tying device for use with a cord and stake comprising a thin plate having a conformation providing a main body and a flange extending integrally from the body at substantially 90° thereto and a tongue integral with body and flange, said body and flange to lie against two adjacent sides of the stake and to receive thereover a plurality of binding turns of the cord when wound around the stake and body, said tongue forming a slot with the body in which the cord may be gripped at the end of said binding turns about the stake and body and at the end of a loop about the plant.

3. A plant tying device for use with a stake comprising a cord and a plate, said plate having a side surface of materially greater area than its edge surface to make frictional engagement with the surface of the stake, said plate having an integral tongue extending in the same direction as the stake and outwardly at an angle to the plate, said tongue forming with the plate a slot to grip said cord in a plurality of binding turns extending around the united plate and stake.

References Cited in the file of this patent

UNITED STATES PATENTS

| | | |
|---|---|---|
| 601,697 | Ament | Apr. 5, 1898 |
| 1,204,868 | Harrah | Nov. 14, 1916 |
| 1,895,753 | Davey | Jan. 31, 1933 |

FOREIGN PATENTS

| | | |
|---|---|---|
| 1,266 | Australia | Jan. 27, 1927 |
| 548,640 | France | Oct. 28, 1922 |
| 680,494 | France | Jan. 22, 1930 |
| 99,982 | Germany | Dec. 31, 1898 |
| 5,844 | Great Britain | 1902 |
| 253,203 | Switzerland | Nov. 1, 1948 |